(12) United States Patent
Thota et al.

(10) Patent No.: US 9,227,180 B2
(45) Date of Patent: *Jan. 5, 2016

(54) MULTIFUNCTIONAL CATALYST ADDITIVE COMPOSITION AND PROCESS OF PREPARATION THEREOF

(75) Inventors: Chiranjeevi Thota, Surajpur (IN); Dattatraya Tammannashastri Gokak, Surajpur (IN); Poyyamani Swaminathan Viswanathan, Surajpur (IN)

(73) Assignee: BHARAT PETROLEUM CORPORATION LIMITED, Mumbai (IN)

( * ) Notice: Subject to any disclaimer, the term of this patent is extended or adjusted under 35 U.S.C. 154(b) by 340 days.

This patent is subject to a terminal disclaimer.

(21) Appl. No.: 13/465,704

(22) Filed: May 7, 2012

(65) Prior Publication Data

US 2013/0130888 A1 May 23, 2013

(30) Foreign Application Priority Data

May 11, 2011 (IN) .......................... 1444/MUM/2011

(51) Int. Cl.

| B01J 29/06 | (2006.01) |
|---|---|
| B01J 29/076 | (2006.01) |
| B01J 35/10 | (2006.01) |
| B01J 23/648 | (2006.01) |
| B01J 29/12 | (2006.01) |
| B01J 38/12 | (2006.01) |
| C10G 11/18 | (2006.01) |
| C10G 11/05 | (2006.01) |
| B01J 23/44 | (2006.01) |
| B01J 29/068 | (2006.01) |
| B01J 29/90 | (2006.01) |
| B01J 37/02 | (2006.01) |
| B01J 37/08 | (2006.01) |
| B01J 38/48 | (2006.01) |
| B01J 23/58 | (2006.01) |
| B01J 23/89 | (2006.01) |
| B01J 23/96 | (2006.01) |
| B01J 29/072 | (2006.01) |
| B01J 29/14 | (2006.01) |
| B01J 29/16 | (2006.01) |
| B01J 35/00 | (2006.01) |
| B01J 35/02 | (2006.01) |

(52) U.S. Cl.
CPC ................ *B01J 29/076* (2013.01); *B01J 23/44* (2013.01); *B01J 23/58* (2013.01); *B01J 23/648* (2013.01); *B01J 23/6482* (2013.01); *B01J 23/892* (2013.01); *B01J 23/8906* (2013.01); *B01J 23/96* (2013.01); *B01J 29/068* (2013.01); *B01J 29/072* (2013.01); *B01J 29/123* (2013.01); *B01J 29/126* (2013.01); *B01J 29/143* (2013.01); *B01J 29/146* (2013.01); *B01J 29/163* (2013.01); *B01J 29/166* (2013.01); *B01J 29/90* (2013.01); *B01J 35/002* (2013.01); *B01J 35/0026* (2013.01); *B01J 35/023* (2013.01); *B01J 35/109* (2013.01); *B01J 35/1019* (2013.01); *B01J 35/1061* (2013.01); *B01J 35/1085* (2013.01); *B01J 37/0201* (2013.01); *B01J 37/0207* (2013.01); *B01J 37/0244* (2013.01); *B01J 37/08* (2013.01); *B01J 38/12* (2013.01); *B01J 38/485* (2013.01); *C10G 11/05* (2013.01); *C10G 11/18* (2013.01); *C10G 11/182* (2013.01); *C10G 2300/405* (2013.01); *C10G 2300/70* (2013.01)

(58) Field of Classification Search
USPC ..................... 502/63, 64, 65, 66, 67, 73, 74
See application file for complete search history.

(56) References Cited

U.S. PATENT DOCUMENTS

| 3,140,264 A | 7/1964 | Oleck |
| 4,064,039 A | 12/1977 | Penick |
| 4,118,339 A | 10/1978 | Latos |
| 4,265,787 A * | 5/1981 | Schwartz ........................ 502/74 |
| 4,285,806 A | 8/1981 | Mooi |
| 4,300,997 A | 11/1981 | Meguerian et al. |
| 4,350,615 A | 9/1982 | Meguerian et al. |
| 4,544,645 A | 10/1985 | Klaassen et al. |
| 4,608,357 A | 8/1986 | Silverman et al. |
| 4,915,035 A | 4/1990 | Clark |
| 4,915,037 A | 4/1990 | Avidan |

(Continued)

FOREIGN PATENT DOCUMENTS

WO 2005/037745 4/2005

OTHER PUBLICATIONS

US Patent & Trademark Office, Office Action and Notice of References Cited issued Jan. 23, 2015 in U.S. Appl. No. 13/322,485.

(Continued)

*Primary Examiner* — Elizabeth Wood
(74) *Attorney, Agent, or Firm* — IPHorgan Ltd.

(57) ABSTRACT

The present invention relates to a multifunctional catalyst additive composition for reduction of carbon monoxide and nitrogen oxides in a fluid catalytic cracking process comprising an inorganic oxide; alumino silicate or a zeolite; a noble metal; a metal of Group I A; a metal of Group II A; a metal of Group III A; a metal of Group IV A; a metal of Group V A; a rare earth oxide; at least a metal of Group VIII. The composition is attrition resistant and is incorporated on a support. The present invention also discloses a process for preparing the multifunctional catalyst additive composition. The present invention also discloses a fluid cracking catalyst comprising the multifunctional catalyst additive composition.

24 Claims, 1 Drawing Sheet

(56) References Cited

U.S. PATENT DOCUMENTS 5,538,624 A * 7/1996 Hettinger ..................... 208/121
6,902,665 B2 6/2005 Peters et al.
7,045,056 B2 5/2006 Kelkar et al.

OTHER PUBLICATIONS

US Patent & Trademark Office, Office Action issued Jun. 25, 2014 in U.S. Appl. No. 13/322,485.

* cited by examiner

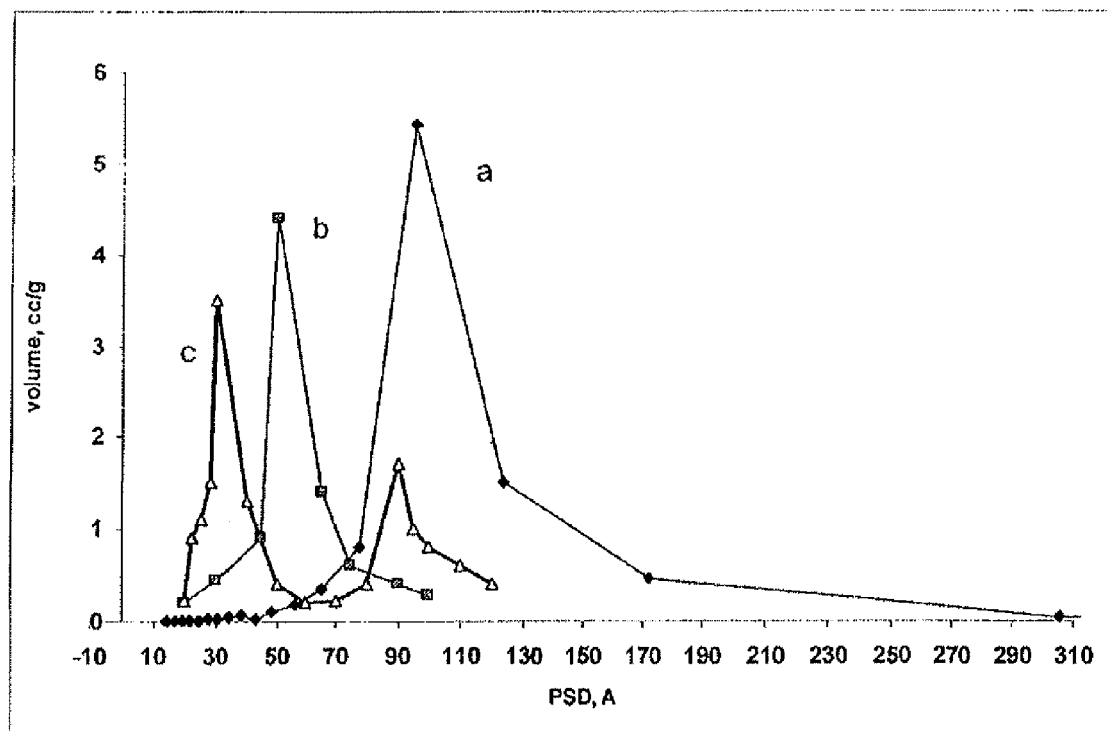
Comparison of pore size distribution of different supports
a,b,c are different supports used for making catalyst additives.

MULTIFUNCTIONAL CATALYST ADDITIVE COMPOSITION AND PROCESS OF PREPARATION THEREOF

FIELD OF INVENTION

The present invention provides a carbon monoxide oxidation and nitrogen oxides ($NO_x$) reduction multifunctional catalyst additive composition for use in fluid catalytic cracking (FCC) process. The present invention also provides a method for making said multifunctional catalyst additive composition using discarded refinery catalyst material. The present invention further provides a process for enhancing oxidation of carbon monoxide, reducing $NO_x$, effective heat recovery and utilization of said multifunctional catalyst additive composition during regeneration without creating dilution effect during cracking process. Thus, the present invention provides a process for reducing emissions of FCC unit.

BACKGROUND OF INVENTION

It is common commercial practice world-wide to produce gasoline, heating oil and diesel fuel by cracking heavier petroleum fractions to lighter, more valuable materials. One of the major commercial techniques for accomplishing this conversion is through fluid catalytic cracking or FCC. In FCC a fraction of petroleum feed such as vacuum gas oil, is contacted with particles of hot, reactive catalyst at high temperatures and medium pressures of about 1 to 4 atmospheres. The catalyst should be in adequate quantity and at high temperature to vaporize the feed, raise the oil feed to a cracking temperature of about 480° C. to 590° C. and supply the endothermic heat of reaction. The oil and catalyst flow together for hydrocarbon conversion to occur. During FCC conversion process of the heavy petroleum feed and middle distillate fractions, by-product coke (carbon) is deposited on the catalyst particles thereby deactivating the catalyst. The carbon deposited catalyst particles are separated from cracked petroleum product in the cyclone. The product is recovered in fractionators and coked catalyst is transported to regenerator. The hot regenerated catalyst is returned to riser for further reaction thus completing the cycle. The FCC process is heat balanced. Burning of coke in the regenerator provides heat, to provide all the heat requirements of the cracking systems. There is a firm liaison between the amount of coke produced during cracking, coke burnt off during regeneration and the heated catalyst returns to the cracking side of the process. This combination is not totally independent and controllable. It is in turn partly influenced by the nature of the petroleum fraction to make more or less coke under a given set of cracking conditions.

It has been the usual FCC operational practice to work out a balance of all the effects and counter effects to adjust feeds, residence times, etc., to achieve a heat balanced operation. Hence the type of feed, feed rate, feed temperature, type of catalyst, catalyst to oil ratio, contact time, reaction temperature etc., are adjusted on the cracking side so as to produce a desirable product slate while depositing ample amount of coke on the catalyst to satisfy the system.

Changes in the system, such as the inherent coking tendency of the feed or catalyst, (over which refiner has no control), are managed with heat exchangers. Airflow rates and/feed pre-heaters are used to adjust the operations to the peculiar requirements of particular situations.

There has always been a need on refiners, to reduce emissions of carbon monoxide and nitrogen oxides like NO, $N_2O$ ($NO_x$) from FCC regenerator in the flue gas. This has in some cases, been accomplished through the use of carbon monoxide boilers and scrubbers. Though these work well, but require sizeable capital investment and pose a problem with respect to maintenance and repair. Thus when a separate on stream carbon monoxide oxidation system is taken out off line for routine or emergency repair and maintenance, there is an inherent increase in the carbon monoxide and $NO_x$ emission from the FCC regenerator. As a result to maintain the purity of stack gas emission standards within tolerable limits, it has been considered necessary to have backup carbon monoxide and $NO_x$ control systems; or to modify the operation of the whole FCC; or to vary from emission control requirements.

Substantial progress has been made towards modifying the operation of an FCC process so as to reduce carbon monoxide and $NO_x$ in the regenerator off gas by reducing or eliminating the need for downstream carbon monoxide oxidation facilities. This is being accomplished by either increasing the air feed to the regenerator or by the use of multifunctional catalyst additive. Burning carbon monoxide in the regenerator tends to increase the heat in the regenerator. This has some beneficial effects upon some FCC operations in that it reduces residual carbon on regenerated catalyst, it may permit a reduction in catalyst inventory; and/or a lower catalyst to oil ratio; and/or a higher cracking temperature. It may also permit cracking feed stocks which are inherently low coke makers because burning less coke substantially all the way to carbon dioxide may generate sufficient heat to make up for the smaller amount of coke.

FCC processes emit carbon monoxide, $NO_x$ etc. in regenerator. As a result, there is an environmental regulation on refiners, to reduce emissions of carbon monoxide and $NO_x$ from FCC regenerator flue gas and also to dispose the used catalysts safely. Reduction of carbon monoxide in some cases has been achieved by the use of incinerators or carbon monoxide boilers. Nitrogen oxides reduction has been achieved by injecting ammonia. The use of incinerators or boilers involves substantial capital investment. Carbon monoxide boilers also create problems with respect to maintenance and repair. Whenever carbon monoxide oxidation system is taken out for various reasons, there is increase in carbon monoxide emissions from the FCC regenerator. The disposal of used catalysts is done in many ways like down grading the material and using for other applications or the material is sent for metal recovery and land filling.

Therefore, in order to maintain the emission of harmful gases in stack gas within allowable limits, it has been thought necessary to have support carbon monoxide control systems or modify the operation of the whole FCC by use of an external agent to reduce emissions of carbon monoxide and $NO_x$ from FCC regenerator flue gas. Effective utilization of the heat generated during the carbon monoxide oxidation process is also required.

U.S. Pat. No. 4,064,039 discloses a catalyst containing Platinum (Pt) or Rhenium (Re) which improves carbon monoxide burning in regenerator dense bed. This patent describes the use of modified FCC catalyst with a noble metal. However this patent does not discuss about the use of refinery discarded catalyst.

U.S. Pat. Nos. 4,915,035 and 4,915,037 teach the use of low surface area porous support (having surface area greater than 50 $m^2/g$) containing silica, alumina, silica/alumina, Kaolin and mixtures containing Pt, Rhodium, Osmium for improving carbon monoxide oxidation. The average particle diameter is in the range of 400-1200 micron. These patents disclose the concentration of Pt in the range of 0.01 to 100 ppm but other metals like Rh, Palladium (Pd) and Osmium (Os) are also disclosed. Actual supports or support material's composition is not revealed in these documents. Besides this the particle size disclosed in these documents is on higher side which may create no uniformity in fluidization in reactor and regenerator. The porous support disclosed in both these documents is used for fluid bed boiler. These patents do not use the refinery discarded material and the end use is different.

U.S. Pat. No. 4,350,615 teaches that small amounts of promoter comprising Pd and Ruthenium (Ru) enhance the oxidation of carbon monoxide without substantially increasing $NO_x$ emissions. The Pd—Ru promoter also enhances the capture of sulfur oxides by using suitable adsorbents within the regeneration zone of FCC without causing excess amounts of nitrogen oxides. This patent does not talk about the recycling of spent or discarded material from refinery.

U.S. Pat. No. 4,544,645 discloses a process for cracking a sulfur containing hydrocarbon and an improved oxidation promoter for converting $SO_2$ to $SO_3$ comprising an intimate association of Pd and at least one other metal selected from the group consisting Pd, Osmium (Os), Iridium (Ir), Re and Rh. This document does not disclose carbon monoxide and $NO_x$ reactions.

U.S. Pat. No. 4,300,997 teaches that small amount of Pd and Ru enhances the conversion of carbon monoxide with out affecting the $NO_x$ levels in the FCC regenerator. Pd to Ru metal ratio varies from 0.1 to 10 weight percentage. This also has additional advantage of removal of $SO_x$ without formation of excessive $NO_x$. However the invention did not use the refinery discarded material.

U.S. Pat. No. 6,902,665 describes compositions comprising a component containing an acidic support, an alkali metal and or/alkaline earth metal, transition metal oxide having oxygen storage capability and Pd metal. The acidic oxide support preferably contains silica alumina. This document describes that certain class of compositions are very effective for CO oxidation promotion, while minimizing the $NO_x$. In this document Ceria is essentially used as integral part of support with the concentration of 2 to 50 parts by weight percentage. However this invention did not use the refinery discarded material.

U.S. Pat. No. 4,608,357 discloses novel catalyst formulations for promoting CO oxidation. This document mainly contains Pd and at least one other precious metal on a porous silica alumina support obtained by leaching sufficient silica from shaped particles of calcined clay with caustic solution to impart porosity to the particles. The support particles preferably has $Al_2O_3/SiO_2$ molar ratio in the range of 1.58 to 1.64; total pore volume of 0.15 cc/g' surface area in the range of 20-60 m$^2$/g; pore structure in the range of 100-600 Å; pore diameter in the range of 150 Å to 350 Å; the noble metal Pd in the range of 50-600 ppm and precious metal Re in the range 300 to 500 ppm. Subject patent deals with only CO oxidation activity but not with NO reduction. The patent also did not use the refinery discarded material.

U.S. Pat. No. 7,045,056 describes a composition for controlling CO and $NO_x$ emissions during FCC processes comprising, acidic oxide support, cerium oxide, lanthanide oxide other than Ceria such as praseodymium oxide, optionally oxide of a metal from groups Ib, IIb such as copper, silver and zinc and Pt or Pd. Different formulations are prepared using $Al_2O_3$, copper modified $Al_2O_3$, Ceria modified alumina. Samples prepared were deactivated by steaming at 1500 F for 4 Hrs using 100% steam. Noble metals Pt and Pd mixture from 50 to 1500 ppm; feed concentration of 0.1 wt % of nitrogen is used. At least one oxide of lanthanide series element viz cerium, praseodymium oxide is used in this document. Even though use of rare earth metals increases the efficiency of the process, however the invention did not use the refinery discarded material.

Not withstanding the amount of material available in the prior art, there is still need for recycling the discarded refinery catalyst material or use fresh superior support for making new multifunctional catalyst additives with better physical properties for CO and $NO_x$ reduction without having dilution effect.

OBJECTS OF INVENTION

The primary object of the invention is to provide a multifunctional catalyst additive composition better than mentioned in prior art.

Another object of the present invention is to provide a carbon monoxide oxidation and $NO_x$ reduction catalyst composition for use in FCC with improved oxidation levels.

Still another object of the present invention is to provide a multifunctional catalyst additive composition which can comprise either fresh support or re-formulated material using spent refinery catalyst.

Yet another object of the present invention is to provide a process for making said multifunctional catalyst additive composition.

Another object of the present invention is to provide a multifunctional catalyst composition which can provide improvements in the control of coke on spent catalyst; reduction of carbon monoxide and $NO_x$ formation; effective heat recovery and utilization during FCC catalyst regeneration.

Still another object of the present invention is to provide a multifunctional catalyst composition that is active for both carbon monoxide oxidation and $NO_x$ reduction and has good attrition strength that is comparable or better than those known in the prior art.

SUMMARY OF INVENTION

The present invention provides a multifunctional catalyst additive composition for reduction of carbon monoxide and nitrogen oxides in a fluid catalytic cracking process comprising (i) an inorganic oxide; (ii) at least 1% of alumino silicate or a zeolite; (iii) at least 0.001% by weight of a noble metal; (iv) at least 0.01% by weight of a metal of Group I A; (v) at least 0.01% by weight of a metal of Group II A; (vi) at least 0.45% by weight of a metal of Group III A; (vii) at least 0.3% by weight of a element of Group IV A; (viii) at least 0.01% by weight of at least a metal of Group V A; (ix) at least 0.05% by weight of a rare earth oxide; (x) at least 0.02% by weight of at least a metal of Group VIII; wherein the composition is attrition resistant, and is incorporated on a support which also gives incremental benefit to cracking.

According to another embodiment of the present invention the support in the multifunctional catalyst additive composition is a fresh support or discarded refinery catalyst from a cracking petroleum process.

According to yet another embodiment of the present invention the fresh support comprises unimodal pore distribution having pores in the range of 20° A to 300° A, preferably in the range of 20 to 100° A, more preferably in the range of 20 to 60° A and surface area in the range 300-400 m$^2$/g, ABD 0.8 and APS is in the range of 50-60 micron.

According to still another embodiment of the present invention the discarded refinery catalyst comprises bimodal pore distribution having pores in the range of 20° A to 50° A and 80° A to 100° A; particle size distribution in the range of 20-120 microns, average particle size of 70 to 85 microns, surface area in the range of 117 to 200 m$^2$/g, matrix surface area in the range of 30 to 35 m²/g, micro pore volume of 0.03 to 0.04 ml/g, bulk density in the range of 0.8 to 0.9 g/ml and attrition index in the range of 2 to 5% by weight.

According to another embodiment of the present invention the noble metal is Palladium in the range of 0.001% to 1% by weight in the multifunctional catalyst additive composition and is in an elemental form uniformly distributed within the catalyst composition.

According to yet another embodiment of the present invention Group IA metal is sodium in the range of 0.01% to 0.25% by weight; Group IIA metal is magnesium in the range of 0.01 to 0.25% by weight; Group IIIA metal is aluminum in the range of 0.45 to 1.0% by weight; Group IVA element is carbon in the range of 0.30 to 1.0% by weight; Group V metals are vanadium in the range of 0.01 to 0.25% by weight or phosphorus in the range of 0.1 to 0.7% by weight; the rare earth oxide is in the range of 0.05% to 1.2% by weight; Group VIII metals are nickel in the range of 0.02 to 0.07% by weight or iron in the range of 0.1 to 0.45% by weight; the alumino silicate or a zeolite is in the range of 1 to 56% by weight; the inorganic oxide is in the range of 1-50 wt % in the multifunctional catalyst additive composition.

According to still another embodiment the present invention provides a fluid cracking catalyst comprising the multifunctional catalyst additive composition as described hereinbefore.

According to another embodiment the present invention provides a process for preparing a multifunctional catalyst additive composition for reduction of carbon monoxide and nitrogen oxides in a fluid catalytic cracking process comprising the steps of i) drying the support by heating ii) incorporating a noble metal onto the dried support; iii) drying and calcinations of the metal incorporated support.

According to yet another embodiment the present invention provides the process for preparing a multifunctional catalyst additive composition wherein the support is a fresh support with an average particle size of about 60-80 microns. Metals like Ni, V, Na, Fe, Mg, rare earth metals are incorporated by sequential impregnation or co impregnation or equilibrium adsorption. After that support is dried and calcined. This calcined material is used as support for incorporation of noble metal and subjected to drying and calcinations steps.

According to still another embodiment the present invention provides the process for preparing a multifunctional catalyst additive composition wherein the drying step of support material consists of (i) heating in glass reactor at 500° C. in air for 4 Hrs; ii) noble metal palladium incorporation into dried support either by equilibrium adsorption or wet impregnation method, either at room temperature or at slightly above room temperature preferably below 40° C. iii) drying the metal deposited material at 110° C. to 120° C. for eight to sixteen hours followed by calcination at 450° C. to 500° C. for three to four hours.

According to another embodiment of the present invention the discarded refinery catalyst contains carbon in the range of 0.3-1.0 wt % and the carbon is burned either before or after incorporation of other metals as discussed above.

According to yet another embodiment of the present invention the discarded refinery catalyst is burned in presence of either oxygen or air preferably 1% Oxygen rest an inert gas like Nitrogen or Helium and the temperature is raised in steps of 2° C. per min ramp.

According to still another embodiment of the present invention the noble metal Palladium is incorporated on the dried support either before or after carbon removal.

According to yet another embodiment of the present invention the coke burned and Palladium deposited in the discarded catalyst support is subjected to high temperature wherein said high temperature is raised in 2° C. per min up to 400°-600° C. in air or in inert atmosphere such as nitrogen.

According to another embodiment of the present invention provides a process for preparing a multifunctional catalyst additive composition for reduction of carbon monoxide and nitrogen oxides in a fluid catalytic cracking process comprising the steps of i) drying the support by heating in glass reactor at 500° C. in air for 4 hours wherein said support is a fresh support or discarded refinery catalyst from a cracking petroleum process. The support having an average particle size of about 60-80 microns, and said discarded refinery catalyst contains carbon in the range of 0.3-1.0 wt % ii) in corporating the noble metal palladium into the dried support by equilibrium adsorption or wet impregnation method either at room temperature or at slightly above room temperature preferably below 40° C. iii) drying the support at 110° C. to 120° C. for eight to sixteen hours iv) calcination of the support at 450° C. to 500° C. for three to four hours v) metals like Ni, V, Na, Fe, Mg, rare earth metals are incorporated either by sequential impregnation or co impregnation or by equilibrium adsorption. After that support is dried and calcined. This calcined material is used as support for incorporation of noble metal and subjected to drying and calcinations steps.

According to yet another embodiment the present invention provides a fluid cracking catalyst comprising the multifunctional catalyst additive composition prepared by the process described hereinbefore wherein said catalyst is attrition resistant, has no dilution effect on cracking and reduces carbon monoxide and nitrogen oxides in a fluid cracking process.

BRIEF DESCRIPTION OF FIGURES

FIG. 1: Comparative pore size distribution of supports used for making the multifunctional additive (Please provide FIGURE).

DETAILED DESCRIPTION OF INVENTION

Having summarized the invention, it is now described in detail below by reference to the following description and non-limiting examples.

Burning of coke deposits from the catalyst in the regeneration zone can be simplified as the oxidation of carbon and reduction of NO and represented by the following chemical equations.

$$C + O_2 \rightarrow CO_2 \tag{1}$$

$$2C + O_2 \rightarrow 2CO \tag{2}$$

$$2CO + O_2 \rightarrow 2CO_2 \tag{3}$$

$$CO + 2NO \rightarrow N_2 + CO_2 \tag{4}$$

Reactions (1) and (2) both occur under typical catalyst regeneration conditions wherein the catalyst temperatures may range from about 500 to 700° C. and are exemplary of gas solid chemical interactions when regenerating catalyst at temperatures within this range. The effect of any increase in temperature is reflected in an increase rate of oxidation of carbon and a more complete removal of coke from the catalyst particles. Gas phase reaction (3) is also accelerated by increased temperature as well as higher pressure and, particularly when excess of oxygen is present. Somewhat lower temperatures may be employed where an added multifunctional catalyst additive is employed. Reaction (4) is most preferred where NO concentrations are more in the regenerator. It helps for the reduction of both NO and CO. The promoter may be incorporated into the catalyst or introduced into the regeneration zone separately. In addition, to the above reactions which relate to the formation of carbon monoxide from carbon, water also forms from hydrogen in the coke.

The use of theoretical amount of oxygen sufficient to burn coke in the fluidized catalyst to a desired low level of residual coke upon regenerated catalyst has the frequent undesirable effect of evolving a combustible mixture of oxygen and carbon monoxide in the dilute catalyst phase. This may undergo further oxidation commonly referred to as after burning. The after burning causes a substantial increase in the temperature of the dilute catalyst phase which may reach 800° C. Such high temperature in the dilute catalyst phase can cause deactivation of the catalyst, thereby require additional catalyst replacement to the process in order to maintain a desired catalytic activity in the hydrocarbon reaction zone. Additionally, these high temperatures may cause damage to hardware components of the regeneration zone.

The present invention is illustrated and supported by the following examples. These are merely representative examples and are not intended to restrict the scope of the present invention in any way.

For the purpose herein, and/or the examples below, and unless otherwise stated, the terms below have the definitions indicated herein:
(i) "Fresh" FCC catalyst is the composite powder material supplied by the manufacturers.
(ii) "Equilibrium catalyst" (E-Cat) is generated in the process over a period of time.
(iii) Spent FCC catalyst which has negligible activity for cracking generated in the process over a period of time.

Example-1

Multifunctional catalyst additives to reduce carbon monoxide and NO reduction were prepared by using a commercially available porous, γ-alumina powder having apparent bulk density of 0.85 g/cc, surface area 332 m²/g, particle size of 20-120 microns and Attrition Index 10. The support material contains unimodal pore size distribution having majority of the pores in the range of 20-100° A. The support was dried by heating in glass reactor at 500° C. in air for 4 hrs, before incorporating noble metal Palladium (Pd). Three sets of carbon monoxide and $NO_x$ reduction catalyst additives were prepared by depositing different amount of Pd (0.1, 0.15, and 0.2 wt %) on to the support by wet impregnation method using Pd metal salt preferably Palladium nitrate. After impregnation the material was dried at 110-120° C. for 10 hrs and calcined at 490-500° C. for 4 hrs. These samples were referred as catalysts—1, 2, 3 respectively.

The carbon monoxide and $NO_x$ reduction activity studies were carried out in a separate set up consisting of a fixed bed glass reactor, a condenser, gas liquid separator and an online $NO_x$ converter, $CO$—$CO_2$ and $NO_x$ analyzer. The reactor was heated using an electric furnace and PID temperature controller/programmer. The analyzers were calibrated with calibration gas containing CO—$CO_2$ and NOx before starting the experiment. A known weight of refinery spent catalyst having carbon and nitrogenous compound deposited on to it during the process was used as base material without adding any oxidation catalyst. 10% weight of additives were used along with the base material in each experiment. The amount of carbon monoxide and NO formed during oxidation reaction with air was taken as the basis for measuring the activity of catalyst. Each experiment was repeated at least two times and the average value taken. Since amount of $CO_2$ formed is large enough and crosses the limits of analyzer hence only amount of carbon monoxide and $NO_x$ formed was considered for this study. The above described catalyst had the following characteristics and activity as given in Table 1.

TABLE 1

Physical properties and Activity of Example-1

| | SA (m²/g) | AI (wt %) | ABD (g/cc) | APS (μ) |
|---|---|---|---|---|
| Support | 332 | 10 | 0.8 | 56 |

| | CO (PPM) | NO (PPM) |
|---|---|---|
| Base Material (1 gm) | 1200 | 700 |

| | Activity | |
|---|---|---|
| | CO Conversion, % | NO Conversion, % |
| Catalyst 1 | 90 | 50 |
| Catalyst 2 | 93 | 55 |
| Catalyst 3 | 96 | 60 |

SA: Surface area,
AI: Attrition Index,
ABD: Apparent bulk density,
APS: Average particle size Even though above carbon monoxide and $NO_x$ reduction catalyst additives have good activity but are not considered for use in plant because of their poor physical properties like attrition strength and APS which may create problem during operation.

Example-2

Another commercial gamma alumina support having surface area of 190 m²/g, and unimodal pores in the range of 30-300° A was used to make another better carbon monoxide and NOx reduction catalyst additive. The support was dried at 500° C. in air for 4 Hrs, before incorporating noble metal Palladium. Four catalysts were prepared by depositing different amount of Pd (0.1, 0.15, 0.2 & 0.25 Wt %) on to the support by wet impregnation method using Palladium metal salt preferably palladium nitrate. Impregnated material was dried and calcined as described in example-1. These catalyst additives were referred as catalysts—4, 5, 6 and 7 respectively. Activity studies were carried out in the similar set up as described in Example-1 by taking 10% of the additives in base material. and the results are given in Table 2.

TABLE 2

Physical Properties and Activity studies of Example-2

| | SA (m²/g) | AI (wt %) | ABD (g/cc) | APS (μ) |
|---|---|---|---|---|
| Support | 190 | 7 | 0.8 | 81 |

| | CO (PPM) | NO (PPM) |
|---|---|---|
| Base Catalyst (1 Gm) | 1200 | 700 |

| | Activity | |
|---|---|---|
| | CO conversion, (%) | NO Conversion, (%) |
| Catalyst 4 | 90 | 55 |
| Catalyst 5 | 94 | 58 |
| Catalyst 6 | 98 | 60 |
| Catalyst 7 | 98 | 60 |

These catalyst additives are also not considered as good because of poor attrition strength which may create problem in plant.

Example-3

In another breakthrough invention multifunctional additive for carbon monoxide and $NO_x$ reduction was prepared by using a refinery discarded spent cracking catalyst as support. Discarded refinery spent catalyst samples were collected from two different FCC units operating under different conditions processing different types of feeds and catalysts. Based on the literature (Fluid Catalytic Cracking Hand Book by Reza Sadeghbeigi published by Gulf publishing Company Houston, Tex. 1995 Pages 79-120) the FCC spent catalyst is believed to be a composite material containing alumina, silica and natural clay based material whose catalytic activity had decreased compared to high activity of fresh catalyst. The loss in activity is mainly due to series of hydrothermal and cracking reactions. Based on the published information it is believed that the spent catalyst contains about 10-45 wt % of a zeolite mostly with wide pores like "Y" or "X" type and 20-45 wt % of alumina component, remaining being clay, silica, transition metals and carbon. The discarded spent catalyst was a fine powder with an average particle size of about 60-80 microns. The particular samples of the commercial catalyst used in these experiments were drawn from the stripper outlet of two different commercial FCC plants running under steady state conditions. Physical properties of the discarded catalysts are given below. The spent catalyst which was used as support material contains bimodal pore distribution having two types of pores in the range of 20-50° A and 80-100° A (FIG. 1). Coke on discarded catalysts was burned off by heating in presence of pure oxygen/air or mixture thereof in appropriate composition for 2-6 Hrs at a temperature of 300-550° C. controlling the heating rate at 2-50° C./min. Two catalyst additives were prepared using these treated spent catalysts collected from two different FCC units as support by following the same procedure as described in Examples 1 and 2 with fixed composition of noble metal 0.2 wt % Palladium. Before incorporation of noble metal the treated spent catalysts which were used as support also contained other metals like 0.1-0.45 wt % iron (Fe), 0.02-0.07 Wt % nickel (Ni), 0.02-0.06 Wt % vanadium (V), 0.01-0.25 wt % sodium (Na), 0.01-0.6 wt % phosphorous (P), 0.01-0.7 wt % magnesium oxide (MgO), 0.05-1.2 wt % rhenium oxide ($Re_2O_3$). The catalysts prepared in this example by using treated spent catalysts collected from two different FCC units were referred as catalyst—8 & 9. Activity studies were carried out in a similar fashion as described in earlier examples using 10 wt % catalyst additives along with base material. The results are given below.

TABLE 3

Physical and activity studies of example-3

|  | SA | AI |  |  | Activity (% convsn) | |
|---|---|---|---|---|---|---|
|  | ($m^2$/g) | (wt %) | ABD (g/cc) | APS (μ) | CO | NO |
| Catalyst 8 | 189 | 2 | 0.9 | 75 | 93 (24) | 53 (15) |
| Catalyst 9 | 196 | 5 | 0.8 | 74 | 92 (23) | 55 (18) |

* Values indicated in parenthesis indicate for base material.

These two oxidation catalysts additives possess better physical properties, good attrition strength and activity. Even though the activity of these catalyst additives is less compared to earlier examples due to their better physical properties retention of the catalyst in the unit are better. Therefore, these catalysts are considered to be better than the others in over all performance.

Example-4

In another embodiment carbon monoxide, $NO_x$ reduction catalyst additives were prepared by using a discarded spent cracking catalyst as support. Coke burning procedure was similar to the one explained in Example 3. In contrast to other examples in addition to one noble metal palladium other noble metal platinum is also added. Three sets of catalyst additives were prepared by depositing different amounts of (Pt&Pd) (0.01&0.06, 0.01&0.05, 0.025&0.025 Wt %) on to the support by sequential wet impregnation method using palladium nitrate and hexa chloro platinic acid metal salts respectively. Impregnated material was dried and calcined as explained in Example 1. These samples are referred to as catalysts—10, 11, 12. The activity results and properties are given in Table 4. All other auxiliary metals cited in the example 1 are also present in this example.

TABLE 4

Physical and activity studies of example-4

|  | SA ($m^2$/g) | AI (wt %) | ABD (g/cc) | APS (μ) |
|---|---|---|---|---|
| Support | 189 | 2 | 0.9 | 75 |

|  | Activity | |
|---|---|---|
|  | CO conversion, % | NO Conversion, % |
| Catalyst 10 | 77 (24) | 35 (15) |
| Catalyst 11 | 76 (24) | 39 (15) |
| Catalyst 12 | 73 (24) | 45 (15) |

* Values indicated in parenthesis indicate for base material.

Even though these catalysts have better physical properties but not considered as good catalysts because of low activity in comparison with other formulations.

Example-5

Synthetic Support

In order to ensure the suitability of use of FCC discarded spent catalyst as support for making the carbon monoxide and $NO_x$ reduction catalyst additive. A synthetic support by using fresh alumina, zeolte and clay with the composition same as that of FCC catalyst was prepared and simulated to make Equilibrium-catalyst by metal and steam deactivation as per the procedure described in Catalysis Today, 141, issues 1-2 (115-119), 2009; and the same after coke burning as described in earlier example-3 were used as supports for making carbon monoxide and $NO_x$ reduction catalyst along with 0.2 Wt % Pd metal deposition as per the method described in earlier Examples and the beneficial and detrimental effect of various metals and their concentration on carbon monoxide and NOx reduction were also studied and the results are as given in Table 5.

TABLE 5

Physical and activity studies of example-5

| Property | Synthetic-1 | Synthetic-2 |
|---|---|---|
| SA (m$^2$/g) | 187 | 198 |
| AI (Wt %) | 4 | 6 |
| ABD (g/ml) | 1 | 0.8 |
| APS (μ) | 76 | 79 |
| Metals | | |
| Pd (wt %) | 0.2 | 0.2 |
| Ni (Wt %) | 0.04 | 0.21 |
| V (Wt %) | 0.51 | 0.33 |
| Na (wt %) | 0.23 | 0.40 |
| Fe (wt %) | 0.39 | 0.42 |
| MgO (wt %) | 0.05 | 0.23 |
| C (Wt %) | 0.01 | 0.01 |
| Al$_2$O$_3$ (wt %) | 44.00 | 42.50 |
| Re$_2$O$_3$ (wt %) | 01.42 | 01.50 |
| Zeolite (wt %) | 38.00 | 39.45 |
| Clay, wt % | 15.30 | 14.9 |
| CO Conv. Activity (%) | 93 (22) | 92 (26) |
| NO Conversion Activity, % | 54 (16) | 56 (18) |

* Values in brackets are base case values.

The above results show that FCC spent catalyst can be used very effectively even in presence of metals like Ni, V, Na, Fe and rare earth oxides in the range discussed above.

The present invention may be applied beneficially to make carbon monoxide oxidation and NO$_x$ reduction catalyst. According to the present invention either fresh FCC catalyst or preferably carefully coke burned FCC spent catalyst with limitation to the quantity of trace metals deposited onto it act as superior supports for making CO oxidation and NO$_x$ reduction catalyst. The discarded spent catalyst used as support after coke burning also possesses good cracking activity (Table 6), possesses long life with better attrition strength in the Catalytic Fluid Bed unit. (Table-7). In addition since the discarded catalyst contain other metals which inhibit the accessibility of finely dispersed Palladium metal coming in contact with sulphur and nitrogenous compounds generally present in Vacuum Gas Oil (VGO) hence increasing the life of the additive.

TABLE 6

Cracking activity of carbon monoxide oxidation additive

| | Yield (%) | |
|---|---|---|
| Product | Base | Catalyst-9 |
| Dry gas | 1.6 | 1.6 |
| Hydrogen | 0.05 | 0.7 |
| LPG | 18.9 | 19.7 |
| Gasoline | 38.8 | 38.3 |
| TCO | 23.4 | 22.1 |
| Bottoms | 12.6 | 13 |
| Coke | 4.6 | 4.6 |
| Conversion | 64.1 | 64.9 |

(Cracking reaction was carried out in Fixed fluid bed reactor supplied by M/s Xytel USA (ACE-R) designed by Kayser) Reaction Conditions were, T-500° C., Cat/oil: 6.5, Feed Injection Rate: 2 gm/min Qty of catalyst used: 6.5 gms.

TABLE 7

Shows the physicochemical characterization of different supports used for making carbon monoxide and NO$_x$ reduction catalyst additives.

| Property | 1 | 2 | 3 | 4 | 5 | 6 |
|---|---|---|---|---|---|---|
| SA (m$^2$/g) | 332 | 80 | 182 | 190 | 187 | 189 |
| AI (wt %) | 10 | 8 | 9 | 10 | 3 | 3 |
| ABD (g/cc) | 0.8 | 0.8 | 0.8 | 0.8 | 0.9 | 0.9 |
| APS (μ) | 56 | 73 | 68 | 80 | 75 | 73 |

Note:
1, 2, 3, 4 - Commercial supports procured from market. 5 and 6 - supports prepared from discarded spent catalysts from refinery. (Examples 3 & 4)

The main advantages of the present invention are:
1. The method of making carbon monoxide and NO$_x$ reduction catalyst for FCC uses novel support with distinct pores.
2. Carbon monoxide oxidation and NO$_x$ reduction catalyst has better attrition resistance property.
3. The method of making multifunctional catalyst additive for FCC is cost effective.
4. Additional benefit of cracking activity in addition to CO and NOx reduction activity.

We claim:

1. A multifunctional catalyst additive composition for reduction of carbon monoxide and nitrogen oxides in a fluid catalytic cracking process comprising a support, which comprises:
   (i) an inorganic oxide material;
   (ii) at least 1% by weight of a "Y" type zeolite;
   (iii) at least 0.001% by weight of a noble metal;
   (iv) at least 0.01% by weight of a metal of Group I A;
   (v) at least 0.01% by weight of a metal of Group II A;
   (vi) at least 0.45% by weight of a metal of Group III A;
   (vii) at least 0.3% by weight of an element of Group IV A;
   (viii) at least 0.01% by weight of at least phosphorous or a metal of Group V A;
   (ix) at least 0.05% by weight of a rare earth oxide;
   (x) at least 0.02% by weight of at least a metal of Group VIII;
   wherein said multifunctional additive composition is attrition resistant.

2. The multifunctional catalyst additive composition as claimed in claim 1 wherein said support is derived from a fresh support or discarded refinery catalyst from a cracking petroleum process.

3. The multifunctional catalyst additive composition as claimed in claim 2 wherein said fresh support comprises inorganic oxide or zeolite with unimodal pore distribution having pores in the range of 20° A to 300° A.

4. The composition as claimed in claim 2 wherein said discarded refinery catalyst comprises bimodal pore distribution having pores in the range of 20° A to 50° A and 80° A to 100° A.

5. The composition as claimed in claim 1, wherein said noble metal is Palladium in the range of 0.001% to 1% by weight, wherein further said Palladium is in elemental form uniformly distributed within the composition.

6. The composition as claimed in claim 1, wherein said metal of Group IA is sodium in the range of 0.01% to 0.25% by weight.

7. The composition as claimed in claim 1, wherein said metal of Group IIA is magnesium in the range of 0.01 to 0.25% by weight.

8. The composition as claimed in claim 1, wherein said metal of Group IIIA is aluminum in the range of 0.45 to 50% by weight.

9. The composition as claimed in claim 1, wherein said element of Group IVA is carbon in the range of 0.3 to 1.0% by weight.

10. The composition as claimed in claim 1, wherein said metal of Group V is vanadium, and wherein said vanadium is in the range of 0.01 to 0.25% by weight or wherein said phosphorus is in the range of 0.1 to 0.7% by weight.

11. The composition as claimed in claim 1, wherein said rare earth oxide is in the range of 0.05% to 1.2% by weight.

12. The composition as claimed in claim 1, wherein said metal of Group VIII are nickel or iron, wherein said nickel is in the range of 0.02 to 0.07% by weight or wherein said iron is in the range of 0.1 to 0.45% by weight.

13. The composition as claimed in claim 1, wherein said zeolite is in the range of 1 to 56% by weight.

14. The composition as claimed in claim 1, wherein said inorganic oxide is alumina.

15. A process for preparing a multifunctional catalyst additive composition for reduction of carbon monoxide and nitrogen oxides in a fluid catalytic cracking process as claimed in claim 1, comprising the steps of:
    i) incorporating by sequential impregnation or co impregnation or equilibrium adsorption Ni, V, Na, Fe, Mg and rare earth metals into the support, wherein said support is derived from a fresh support or discarded refinery catalyst from a cracking petroleum process;
    ii) drying the said support by heating;
    iii) incorporating a noble metal into the dried support;
    iv) drying the support;
    v) calcination of the support.

16. The process as claimed in claim 15, wherein said drying in step (ii) is by heating in glass reactor at 500° C. in air for 4 Hrs.

17. The process as claimed in claim 15, wherein said noble metal is palladium and is incorporated into dried support either before or after a step of carbon removal by equilibrium adsorption or wet impregnation method either at room temperature or at slightly above room temperature.

18. The process as claimed in claim 15, wherein said drying in step (iv) is at 110° C. to 120° C. for eight to sixteen hours.

19. The process as claimed in claim 15, wherein said calcination of the support is at 450° C. to 500° C. for three to four hours.

20. The process as claimed in claim 15, wherein said discarded refinery catalyst contains carbon in the range of 0.3-1.0 wt %, is burned either before or after incorporation of metals in presence of either oxygen or air and heating at a rate of 2° C. per minute.

21. The process as claimed in claim 15, wherein the support is derived from a discarded refinery catalyst, having coke burned off and Palladium deposited therein, wherein the discarded catalyst support is subjected to high temperature wherein said high temperature is raised in 2° C. per min up to 400°-600° C. in air or in inert atmosphere.

22. The process as claimed in claim 15, comprising the steps of:
    i) incorporating by sequential impregnation or co impregnation or equilibrium adsorption Ni, V, Na, Fe, Mg and rare earth metals into the support;
    ii) drying the support by heating in glass reactor at 500° C. in air for 4 hours wherein said support is derived from a fresh support or discarded refinery spent catalyst from a cracking petroleum process with an average particle size of about 60-80 microns and said discarded refinery spent catalyst contains carbon in the range of 0.3-1.0 wt %;
    iii) incorporating the noble metal palladium into the dried support by equilibrium adsorption or wet impregnation method either at room temperature or at slightly above room temperature;
    iv) drying the support at 110° C. to 120° C. for eight to sixteen hours;
    v) calcination of the support at 450° C. to 500° C. for three to four hours.

23. A fluid cracking catalyst comprising the multifunctional catalyst additive composition as claimed in claim 1, wherein said catalyst is attrition resistant, has no dilution effect on cracking and reduces carbon monoxide and nitrogen oxides in a fluid catalytic cracking process.

24. The multifunctional catalyst additive composition of claim 1, wherein said "Y" type zeolite is an ultra stable Y zeolite.

* * * * *